United States Patent [19]

Pearce

[11] 4,174,462
[45] Nov. 13, 1979

[54] INDUCTION FURNACES FOR HIGH TEMPERATURE CONTINUOUS MELTING APPLICATIONS

[76] Inventor: Michael L. Pearce, 741 Windsor-Perrineville Rd., East Windsor, N.J. 08520

[21] Appl. No.: 891,909
[22] Filed: Mar. 30, 1978
[51] Int. Cl.² ............................................. H05B 5/00
[52] U.S. Cl. ................................ 13/26; 219/10.49 R
[58] Field of Search .................... 13/26, 27; 219/10.49

[56] References Cited
U.S. PATENT DOCUMENTS

| | | |
|---|---|---|
| 3,165,572 | 1/1965 | Burtenshaw et al. .................... 13/27 |
| 3,376,915 | 4/1968 | Chandley .......................... 13/27 UX |
| 3,636,293 | 1/1972 | Schneider et al. ................ 210/10.49 |

Primary Examiner—Roy N. Envall, Jr.
Attorney, Agent, or Firm—Martin Sachs

[57] ABSTRACT

An induction furnace for high temperature continuous melting applications utilizes low frequency induction heating of novel graphite susceptor systems and includes means for varying both the amount of power and the distribution of power over the susceptor in order to maintain continuous pollution-free melting of the raw material over a range of melt rates while maintaining constant tap temperature. The furnace has a long campaign life, short start-up and shut-down times, and low operating cost.

17 Claims, 12 Drawing Figures

INDUCTION FURNACES FOR HIGH TEMPERATURE CONTINUOUS MELTING APPLICATIONS

BACKGROUND OF THE INVENTION

This invention relates to induction furnaces and, in particular, to a continuous flow induction furnace for use in melting high temperature materials such as glasses, refractories, ceramics, or the like and utilizes graphite susceptors which permits ready replacement thereof.

The prior art abounds with electric furnaces for the production of silicon and other materials of similar nature. Often, these furnaces also utilize induction heating in order to reduce the raw material to a molten mass. However, few of these furnaces are of the continuous flow type.

United States patents to Schneider et al on Jan. 18, 1972 having U.S. Pat. No. 3,636,293; Beckius et al on May 21, 1957 having U.S. Pat. No. 2,793,242; and Conant on Dec. 11, 1956 having U.S. Pat. No. 2,773,750 appear to be the most pertinent.

The patent to Schneider et al discloses a continuous flow furnace utilized for melting vitreous-type materials by means of induction heating. The materials to be melted are supported in an electrically conductive cylindrically-shaped susceptor and are temporarily supported on a refractory support mounted within the cylinder. The refractory support is provided with a plurality of orifices through which the materials, melted by heat radiated from the inductively heated susceptor, may flow into a lower chamber. The material in the lower chamber is held with additional heating for a time sufficient to complete the required time-temperature relationship. The susceptor cylinder is divided into sections and may be fabricated of graphite while the refractory supports may be fabricated of zircon or graphite.

The patent to Beckius et al, relates to the production of silicon and other similar materials, and discloses a continuous flow electrical induction furnace, including a plurality of heating zones and a multi-sectioned graphite cylinder susceptor serving as a secondary winding for generating heat provided for the charged material. The susceptor cylinder sections are mounted one above the other in interlocking manner and are surrounded by a pulverulent easily removable layer of heat resistant material which permits the ready replacement of susceptor sections as they are consumed in the melting process.

The patent to Conant relates to a continuous flow furnace utilized for the heat treatment of materials which are accompanied by the presence of gases or vapors and includes means to effect the separation of the solid, vapor and molten states of the charged material, providing separate discharge paths for the vapor and molten states thereof. The furnace utilizes induction heating with a cylindrically-shaped susceptor which may be fabricated of graphite and includes a conically-shaped core with a recessed opening on the bottom thereof, adapted to receive a weir which is threaded into the bottom portion of the furnace and is provided with an aperture communicating with the outside thereof. The furnace is a small scale device which utilizes high frequencies for operation and is of low efficiency. As discussed above, prior art does not disclose the configuration of the present invention or is there any suggestion thereof. The features disclosed in the present invention which include a plurality of susceptor sections stacked one upon the other to form a cylinder with selected sections including a conically shaped baffle surrounded by a plurality of orifices for the molten charge to flow therethrough and be directed to provide a mixing thereof, has not been shown or suggested. The specific construction of the present furnace with regard to the susceptor, insulator and reactor shield relationship with respect to a tapped induction coil has not been shown or suggested.

The instant invention overcomes the shortcomings found in the prior art by providing a continuous stream of molten material with the capability of closely and independently controlling both the flow rate and the temperature of the molten stream. The furnace is a closed system involving no gaseous effluents, and hence there are no pollution control requirements. The same furnace construction may be used for a wide variety of materials and a wide range of melt rates and tap temperatures can be achieved with ease. The present furnace has very low maintenance requirements, long campaign life, low consumable costs, and is capable of starting and stopping in a small fraction of the time required by other furnaces currently known in the state of the art.

Therefore, it is the object of the present invention to provide a relatively inexpensive continuous flow induction furnace for the pollution free melting of high temperature non-conducting (non-metallic) materials such as glasses, refractories, ceramics or the like.

Another object of the present invention is to provide a continuous flow induction furnace which utilizes a susceptor which is also the container vehicle.

A further object of the present invention is to provide an induction furnace which includes specially designed baffle configurations disposed within the susceptor to maximize the transfer of heat into the charge.

A still further object of the present invention is to provide an induction furnace having graphite hearths which permits continuous tapping of the furnace without permitting solid (unmelted) materials to be entrained in the melt stream.

Another object of the present invention is to provide an induction furnace which utilizes a tapped induction coil disposed along the longitudinal axis of the furnace enabling proper distribution of the power input over the length or height of the susceptor so that the melt rate and tap temperature may be varied independently and in a controlled fashion.

Still another object of the present invention is to provide an induction furnace which includes means for easy replacement of the susceptor element.

Yet another object of the present invention is to provide an induction furnace which utilizes a fully charged, continuously loaded, closed system at all times, so that the graphite susceptor and hearth are effectively protected against air oxidation and has literally no gaseous effluent.

An additional object of the present invention is to provide a graphite susceptor for the efficient use of low frequency electrical energy for heating.

Still an additional object of the present invention is to provide a graphite susceptor which resists attack by molten oxide materials.

SUMMARY OF THE INVENTION

A continuous flow induction furnace for the melting of high temperature non-conducting materials such as glasses, refractories, ceramics, or the like in accordance with the principles of the present invention, comprises a hollow, cylindrically-shaped shield means disposed along the relatively large longitudinal axis of the furnace, a primary inducing means circumscribing the outer surface of the shield means and disposed along a substantial portion thereof, the inducing means being provided with means for selectively introducing varying amounts of power, hollow cylindrically-shaped susceptor means serving as a secondary winding means for the absorbtion of the power and converting it into heat, the susceptor being disposed within the primary inducing means and extending along the longitudinal axis for at least the length of the inducing means, powdered insulating means disposed between the outer surface of the susceptor means and the inner surface of the shield means for retaining the heat generated within the furnace, and hearth means, the hearth means including an orifice and insuring the continuous flow of the uncontaminated molten material.

The subject matter which I regard as my invention is particularly pointed out and distinctly claimed in the concluding portions of this specification. My invention, itself, however, both as to its organization and method of operation, together with further objects and advantages thereof, may best be understood by reference to the following description taken in conjunction with the accompanying drawings.

DESCRIPTION OF THE PREFERRED EMBODIMENTS

Figure 1:
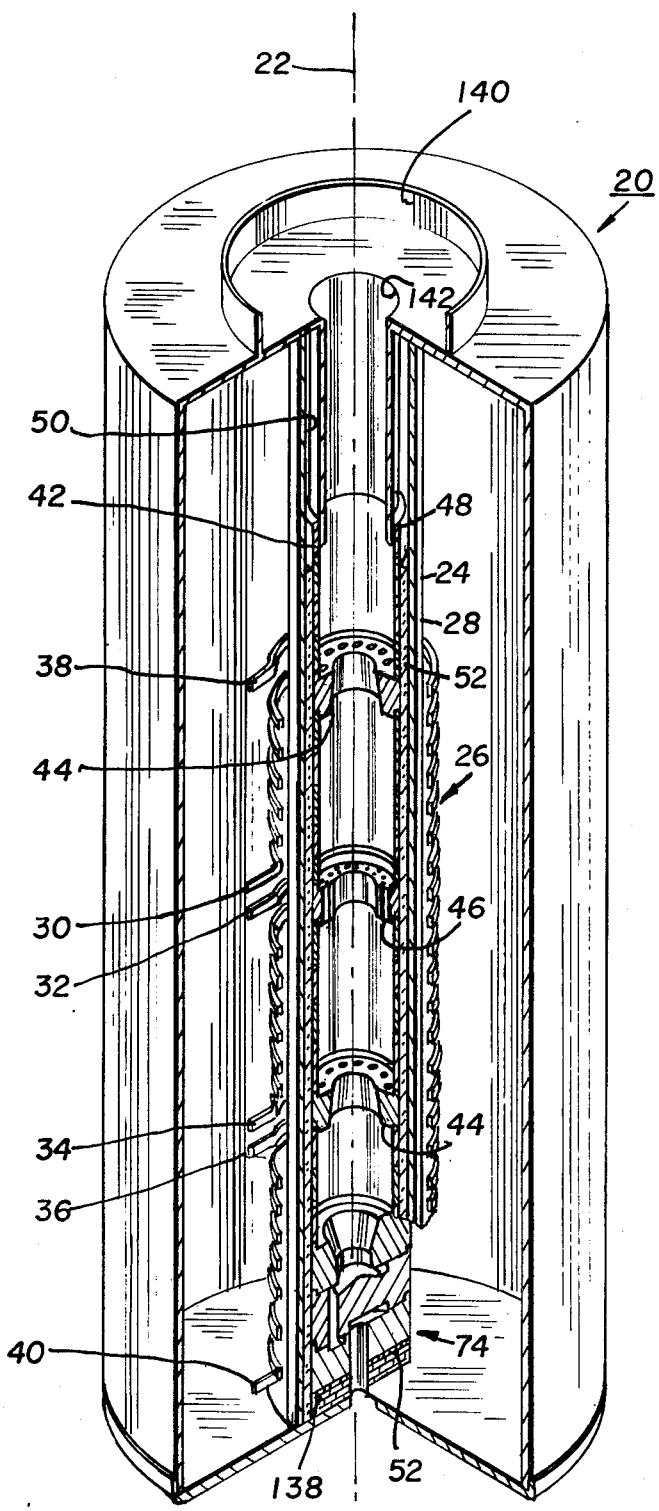
FIG. 1 is a pictorial representation, partially broken away, of a continuous flow induction furnace in accordance with the principles of the present invention.

Referring now to the drawings, and in particular to FIG. 1, there is shown an induction furnace 20 for high temperature continuous melting applications, incorporating the principles of the present invention. The furnace 20 has a relatively large axial or longitudinal length as compared to its horizontal or transverse axial dimension. The longitudinal axis is indicated by the numeral 22. The furnace includes a hollow, cylindrically-shaped shield means disposed along longitudinal axis 22. A coil 26 circumscribes the outer surface 28 of the shield 24 and is provided with a plurality of taps 30, 32, 34, 36, 38 and 40, which enables energizing power to be coupled between the ends of the coil 38 and 40 and any intermediate tap in between.

A hollow, cylindrically-shaped susceptor 42 serves as a secondary winding for the inducing means of coil 26, thus the susceptor functions as a shorted turn and absorbs the energy introduced into the coil and converts it into heat. The susceptor extends within the coil 26 along the longitudinal axis 22 for at least the length of the coil. The susceptor may be constructed of a single cylindrically-shaped graphite member or, for ease of construction and assembly, is divided into hollow cylinders disposed one above the other. In addition, portions of the susceptor may include baffles 44 and 46 which are shown in greater detail in FIGS. 2, 3, 4 and 5.

Figure 2:
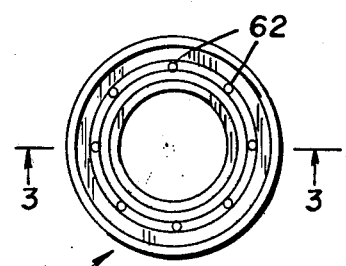
FIG. 2 is a plan view of a cone-type baffle.
Figure 3:
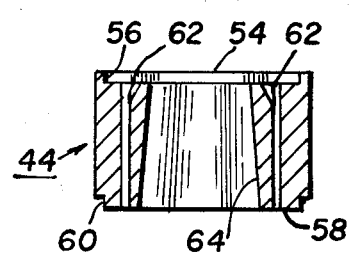
FIG. 3 is an axial section of the cone-type baffle taken along the line 3—3 of FIG. 2.

Between the outer surface 48 of the susceptor 42 and the inner surface 50 of the shield 24 powdered insulating material 52 is provided. This material is generally non-conducting carbon black which is incapable of absorbing energy from the coil 26. It functions to retain heat between the susceptor 42 and the shield 24, which is fabricated from a compound of asbestos and concrete, which helps retain the heat internally and provides the necessary structural integrity for the central furnace configuration. FIGS. 2 and 3 disclose the configuration of a cone-type baffle 44. The upper surface 54 of the cone-type baffle 44 is provided with a recess 56 while the lower surface 58 is provided with a protusion or extension 60. The protusion 60 and recess 56 are provided in each of the plurality of sections of the susceptor 42, thus enabling each of the co-axially disposed susceptor units to be mated one within the other and stacked along the longitudinal axis 22. The cone-shaped baffle 44 is additionally provided with a plurality of apertures 62 which tend to take the molten material flowing down the generally larger centrally disposed aperture 64 and move it closer to the outer surface of baffle 44, thereby transferring material from the inner cooler portion of the susceptor to the outer hotter wall thereof and tending to mix the material throughout the furnace.

Figure 4:
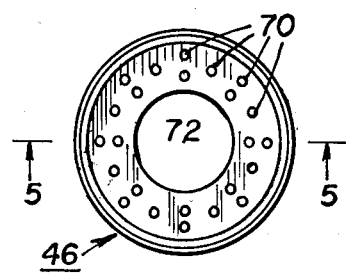
FIG. 4 is a top or plan view of a sieve-type baffle.
Figure 5:
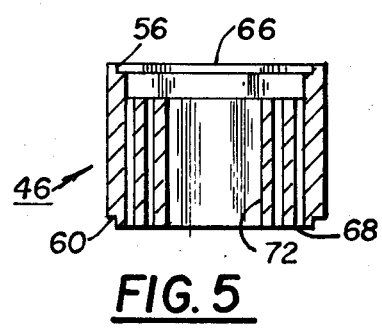
FIG. 5 is an axial sectional view of the sieve-type baffle taken along the line 5—5 shown in FIG. 4.

A sieve-type baffle 46 is shown in FIGS. 4 and 5. The sieve-type baffle is provided with nesting recesses 56 and 60 on its upper and lower surfaces 66 and 68, respectively. In addition, the sieve-type baffle is provided with a plurality of apertures 70 which are relatively small in size and tend to filter and mix the molten material. In addition, baffle 46 is provided with a centrally disposed aperture 72 which is much greater in size than the apertures 70. Here again, the apertures are designed to direct the flow of both molten and solid material and convey heat generated in the susceptor wall to the charge material which is centrally disposed within the furnace.

Induction heating techniques have been known for many years. Generally, it is convenient to divide such induction heating techniques into two categories: high frequency (above 1000 Hertz, and usually above 5000 Hertz) and low frequency (below 1000 Hertz and usually less than 500 Hertz) applications. High frequency application invariably utilizes a susceptor made of graphite or other suitable refractory and electrically conducting material. It has the advantage of great versatility, fast heating rates, small and/or thin wall susceptors (crucibles) and high tolerance of poor coupling between the induction coil and the susceptor. However, penetration of the inducing field into the susceptor is very shallow and hence high frequencies are not suitable for direct heating of electrically conducting charged materials e.g. scrap metal, or so-called core-less applications. At the lower frequencies, the penetration is much greater and the conversion of electrical power to heat is achieved in a more efficient manner. Hence, low frequency induction heating is suitable for large industrial applications involving the heating and melting of electrically conducting materials. To melt such materials, it is only necessary to fragment them, place them in a suitable refractory container vehicle, surround the vehicle with an appropriately designed induction coil, apply the low frequency to the coil and wait for the temperature of the charge to exceed the melting point. It should be noted that such applications do not involve an electrically conducting, inert susceptor, can only be applied to relatively narrow ranges of electrically conducting charge materials, are limited by the upper temperature capability of the container vehicle and its compatability with the melt, and are essentially batch melters. However, low frequency induction heating is not suitable for the melting of a wide range of high temperature (glass, refractory, ceramic) materials, because such materials are not electrically conducting, will attack most container vehicles in a molten state and are usually beyond the temperature capabilities of coreless induction furnaces. The present invention, however, is designed to overcome these shortcomings and is specifically designed to work at low frequencies (50 through 180 Hertz).

The coil of the present invention is fabricated of hollow copper tubing and is connected to a power source, not shown, and a water source, also not shown, which provides cooling to the coil by circulating water through the hollow center of the coil. Connections to the tap sections of the coil will be explained hereinafter in describing the operation of the induction furnace.

Figure 6:
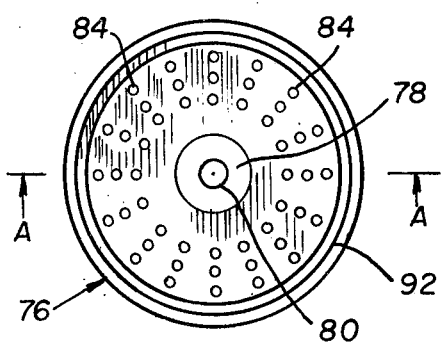
FIG. 6 is a plan view of one embodiment of an upper hearth section.
Figure 7:
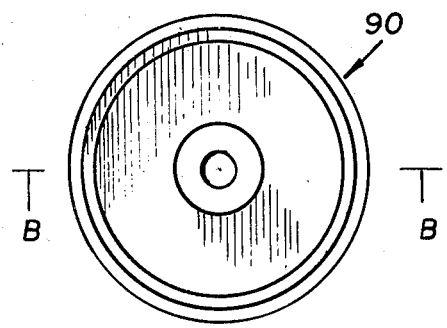
FIG. 7 is a plan view of the lower hearth section of the same embodiment shown in FIG. 6.
Figure 8:
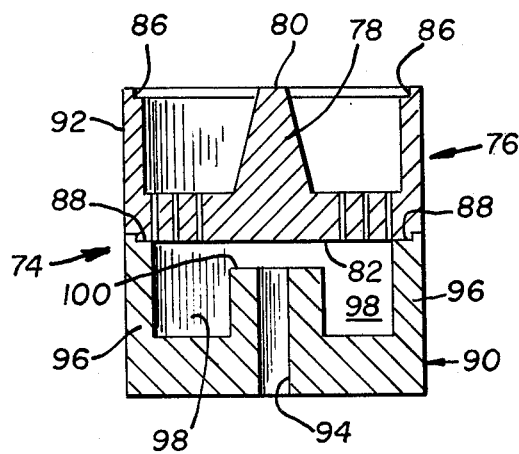
FIG. 8 is a cross sectional view of the combined upper and lower hearth sections shown in FIGS. 6 and 7 with the cross section taken along the lines A—A and B—B respectively.

Centrally disposed in the lower portion of the furnace 20 is a hearth 74, the hearth 74 may include a plurality of sections, such as for example, shown in FIGS. 6 and 7; the upper hearth section 76 is shown in FIG. 6 and in the upper portion of FIG. 8. The upper hearth section 76 is provided with a conically-shaped central portion 78 which increases in diameter from its top surface 80 to the lower or bottom surface 82. A plurality of relatively small apertures 84 are circumferentially disposed about the central portion 78. The upper hearth section 76 is also provided with a recess 86 and protusion 88 to permit nesting with the lower hearth section 90, shown in FIG. 7 and the lower portion of FIG. 8. The upper hearth section 76 is also provided with a cylindrically shaped wall portion 92 which is aligned with the other sections of the susceptor 42. Lower hearth section 90 is provided with a centrally disposed aperture 94 which is adapted to receive an output nozzle or tap, not shown. The lower hearth section 90 is also provided with a wall portion 96 which is cylindrically shaped and co-axial with wall portion 92 of the upper hearth section 76. The recessed portion 98 of the lower hearth portion 90 functions as a reservoir until the molten material can reach the upper surface 100 and then overflow into and through aperture 94 and through the output nozzle, not shown.

Figure 9:
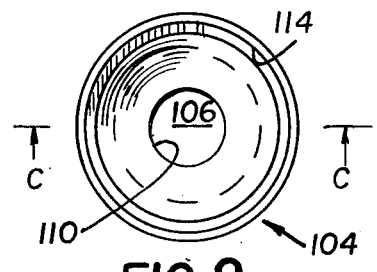
FIG. 9 is a plan view of an upper hearth section of an alternative embodiment of the present invention.

An alternate hearth configuration 102 is shown in FIGS. 9, 10, 11, 12 and pictorially in the lower portion of FIG. 1. The upper hearth section 104 is shown in FIG. 9 and the upper portion of FIG. 12, and is provided with a conically-shaped centrally-disposed reservoir 106 with its largest open portion 108 occurring at the top surface of the upper hearth section 104 and its narrow portion 110 occurring proximate the lower surface 112, thereby forming a funnel for the molten material to flow therethrough. Here again, the upper hearth section is provided with a recess 114 and protusion 116 to permit the proper nesting with the other hearth sections.

Figure 10:
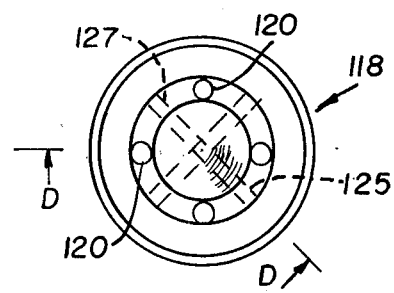
FIG. 10 is a plan view of a middle hearth section of the alternative embodiment.
Figure 11:
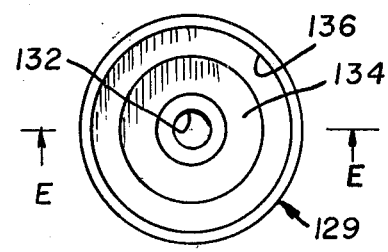
FIG. 11 is a plan view of the lower hearth section of the alternative embodiment.
Figure 12:
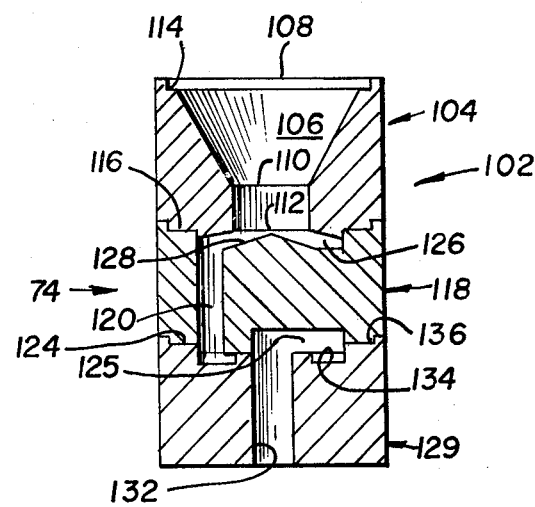
FIG. 12 is a cross sectional view of the alternative embodiment including the upper hearth section of FIG. 9, middle hearth section of FIG. 10 and the lower hearth section shown in FIG. 11 taken along the lines C—C, D—D, and E—E, respectively.

The middle hearth section 118 is shown in FIG. 10 and the central portion of FIG. 12, and is provided with apertures 120 which extend from the upper surface 128 to the lower surface 124 of middle hearth section 118. In addition, downwardly sloping channels 126 and 128 are formed between the middle and upper hearth sections 118 and 104. Molten material flowing through the aperture 120 moves around the annular cavity 134 formed by the middle and lower hearths 118 and 129 until it encounters the radial slots 125. It then moves through these slots and exits the furnace via the tap hole 132. A nozzle, not shown, may be inserted into aperture 132. The lower hearth section 129 is also provided with a recess 136 to permit the proper nesting with the middle hearth section 118. The design of the hearths as as disclosed in FIGS. 8 and 12 insures that the continuous flow of molten material is uncontaminated by unmelted charge material.

The outer diameter and height of the graphite susceptor column and hence the size of the coil are determined by the required melt rate to be obtained. At 180 or 150 Hertz it is not practical to use diameters less than 12 inches because the power efficiency (ratio of heat generated in the furnace to the electrical energy used) decreases rapidly as the diameter is decreased below 12 inches. Unfortunately, at the present time, diameters greater than 30 inches are not possible in the specialty grades of graphite required. Table 1 below indicates the optimum values for the diameters and column heights required for a nominal melt rate in the range of 1000 to 8000 lbs./hour for a material being tapped at approximately 1400 degrees C.

TABLE 1

| MELT RATE lbs./hour | SUSCEPTOR DIAMETER (inches) | HEIGHT (ft.) | POWER (KW) | COIL HEIGHT(ft.) |
|---|---|---|---|---|
| 1000 | 12 | 9 | 500 | 6 |
| 3000 | 18 | 9 | 1000 | 6 |
| 5000 | 24 | 12 | 1500 | 8 |
| 8000 | 24 | 18 | 2500 | 12 |

In all the cases set forth above the susceptor wall thickness is preferably 2 inches or more, in order to maintain a proper power efficiency. In order to maximize the heat transfer properties of the susceptor and hence the melt rate, and to mix the material as it moves down the furnace, some of the sections of the graphite susceptor column are machined in complex designs, such as shown in FIGS. 2 and 3 called cones and as shown in FIGS. 4 and 5 called sieves. It is preferable to mount a cone configuration over a sieve configuration, so that the effect is to move raw material out from the cool center of the furnace towards the hot interior susceptor wall. At the same time, both the cone and sieve baffle serve to conduct heat into the cool interior mass of raw material to increase the susceptor to raw material contact, and to direct the flow of hot melted material over solid unmelted material. The configurations as shown in FIGS. 2 through 5 have been found to be successful with materials melting at approximately 1200 degrees C. Different materials will require small modifications in the general configurations as disclosed for optimum performance and may be determined by experimentation.

The hearth configuration shown in FIGS. 9, 10, 11 and 12 has been proved to be quite effective for lower melt rates and is more effective in preventing the entrainment of solids in the tap melt. The center tap hole design as shown in FIGS. 6, 7, and 8 is useable over a greater range, and may include an elevated hearth feature which is required for high melting materials and higher tap temperatures. Support rings, not shown, of graphite, concentric with, but somewhat smaller than the susceptor column, may be used to elevate the hearth and contain vertical (longitudinal) slits to inhibit induced heating from the fringe effects of the coil. Beneath the hearth a layer of carbon black 52 is preferred for very high temperature applications. Beneath the carbon black, a refractory brick 138 must be included. It, preferably should have a 3000 degree Fahrenheit capability and be bonded with 3000 degree Fahrenheit refractory cement.

The asbestos reinforced concrete reactor shield 24 preferably should have a wall thickness of between 1 and 2 inches. For maximum susceptor temperatures up to 1700 degrees C. (tap temperatures to 1500 degrees C.) the thickness of the carbon black insulation 52 between the susceptor 42 and the shield 24 preferably should be as little as 2 inches. For higher temperature applications, up to 3 inches of insulation may be required in order to adequately protect the reactor shield against thermal damage. Obviously using 3 inches of insulation would cause a lower power efficiency because of the poor coupling between the coil 26 and the susceptor 42.

In the preferred embodiment the coil should be divided into at least four sections. The lower section is coupled to a variable source of power which allows the temperature of material flowing out of the tap hole to be both selected and controlled. The other sections are designed to be individually and separately connected to the power source at the option of the operator, thereby controlling the distribution of energy over the length of the susceptor and hence the rate of melting of the material in the furnace. If a multi-section coil were not utilized, the only method for varying the melt rate or tap temperature would be to change the level of the input power, rather than the distribution of the power as in the present embodiment. Hence, in the prior art systems, the melt rate and tap temperature could not be varied independently. Some applications, such as that for inorganic fiber production, which are highly sensitive to temperature, require a capability for varying the melt rate while the tap temperature is maintained constant. The continuously variable amounts of power coupled to the lower section of the coil, as shown in the present invention, allow close control of the tap temperature by controlling the proportion of the total power which is imposed upon the hearth. Moreover, the insertion or removal of power from the upper sections of the coil, allows large incremental variations in the total melt rate, which when combined with continuously variable power applied to the lower section, effectively provides continuous variability of the melt rate over the range of 30 to 100% of the design capacity, while tap temperature is maintained constant at a selected value.

It has also been discovered that particle size of the charge raw material influences the melting characteristics of the system. A substantial portion of large (greater than 2 inches maximum diameter) particles can reduce the melt rate by reducing the material/susceptor contact and impeding the flow of material through the furnace. On the other hand, the inclusion of a large proportion of fine material (less than 8 mesh) also reduces the melt rate, because the thermal transfer properties of the mass are impaired. The amount of fine material which can be tolerated, together with the magnitude of the effect, is dependent on both the size of the furnace and the composition of the raw material. When high purity sand was substituted 100% for pea gravel in a 5000 lb./hour furnace the melt rate was reduced by 40%. Alternatively, the inclusion of 25% fine material in a 1000 lb./hour furnace melting basalt had a barely discernible effect. It is recommended that fine material should be kept below 20% by weight and that material greater than 2 inches in diameter be kept below 5%.

The furnace must be equipped with a raw material storage and feed hopper, not shown, which must be coupled to the upper reservoir 140 of the furnace 20 permitting the raw material to flow down to aperture 142. The storage and feed reservoir must always be kept loaded when the furnace is in operation. If the graphite susceptor column is permitted to be less than completely full, serious oxidation damage may occur to the graphite susceptor. Generally, it is preferable to equip the lower portion of the hopper with a fail-safe system (such as a photo-electric device) which will function to sound an alarm or turn off the power supply when the raw material level drops below the safe operating point.

The preparation of the furnace for operation is accomplished by undergoing a very slow initial heat-up time to drive the moisture out of the system (particularly the shield 24) without causing damage thereto. This warm-up procedure should take approximately three days and should involve a very slow step application of heat e.g. twelve hours, as the reactor shield 24 is heated through the range of 100 to 120 degrees C. After such initial three day slow heating, the furnace may be heated up from a cold start in a little more than an hour. However, in most applications the furnace will be operating for 24 hours on a six or seven day per week schedule and therefore, periods of shutdown (melting not required) will infrequently be required. When shutdown is required, the melting operation can be effectively terminated in a matter of a few minutes by terminating all power input to the coil 26. Once the melting has ceased, the furnace can be banked (held at a temperature just below the melting point of the charge material), by setting the power input at an appropriate predetermined level which usually represents a non-productive power utilization of 30 to 100 KW depending on the size of the furnace. Thereafter, melting of the material can be restarted in a matter of minutes (2 through 5) by simply restoring the power input to the coil at the normal operating level. Therefore, it is quite obvious that the cost of banking a furnace is nominal (less than $5.00 per hour) and the advantage of a quick start-up is substantial. Hence, even for production interruptions of several hours or as much as two or three operating shifts, it often is more economical to bank the furnace rather than shut it down completely.

In operation, the furnace is silent and extremely simple. The power input control consists of an on/off switch and coarse and fine control knobs on the power supply, not shown. The operator will be required to periodically monitor a thermocouple read-out, not shown, which will indicate the temperature of the hearth (or, for high temperature applications, a point in the carbon black which is close to the hearth). It should be noted that the life of susceptor is highly dependent upon the chemical composition of the raw material. For mixed oxide systems which do not contain components reduceable by carbon at the susceptor temperature e.g. such as the oxides of silicon, aluminum, calcium, magnesium, sodium, potassium, boron, etc., graphite components will last for years as compared to a campaign life of a little more than a 100 days for arc furnaces. The inclusion of reactive reducible oxides e.g., such as those of iron, chromium, nickel, vanadium, cobalt, etc., in significant concentration (greater than 5%) will normally reduce the campaign life to several or even a few months. The task of replacing the graphite can be reduced in such circumstances by designing the susceptor as two concentric cylinders (double wall construction) and arranging for the central section of the base plate to be removable so that the hearth and inner cylinder can be easily dropped out without disturbing the rest of the system.

Hereinbefore, has been disclosed an induction furnace for high temperature continuous melting applications which is efficient, easy to operate, and is relatively inexpensive. It will be understood that changes in the details, materials, arrangements of parts and operating conditions, which have been herein described and illustrated to explain the nature of the invention, may be made by those skilled in the art within the principles and scope of the present invention.

Having thus set forth the nature of the invention, what is claimed is:

1. A continuous flow induction furnace for the melting of high temperature non-conducting materials such as glasses, refractories, ceramics, or the like, said furnace having a relatively large axial length comprising:
   (a) hollow, cylindrically-shaped shield means disposed along the longitudinal axis of said furnace;
   (b) primary inducing means circumscribing the outer surface of said shield means and disposed along a substantial portion thereof, said inducing means being provided with means for selectively introducing varying amounts of power;
   (c) hollow, cylindrically-shaped susceptor means serving as a secondary winding means for the absorption of said power and converting to heat, said susceptor being disposed within said primary inducing means and extending along said longitudinal axis for at least the length of said inducing means;
   (d) powdered insulating means disposed between the outer surface of said susceptor means and the inner surface of said shield means for retaining the heat generated within the furnace; and
   (e) hearth means, said hearth means including an orifice and insuring the continuous flow of the uncontaminated molten material.

2. A continuous flow induction furnace according to claim 1 further including a plurality of baffle means horizontally disposed within said hollow susceptor along said axial length for causing effective transfer of heat into said molten material.

3. A continuous flow induction furnace according to claim 1 wherein said susceptor means includes two concentric cylinders disposed one above the other and a base plate having a removable central section means for readily removing said hearth means and said concentric susceptor cylinders.

4. A continuous flow induction furnace according to claim 1 further including an outer shell adapted to enclose and protect said furnace.

5. A continuous flow induction furnace according to claim 4 wherein said outer shell is cylindrically-shaped.

6. A continuous flow induction furnace according to claim 1 wherein said means for selectively introducing varying amounts of power includes providing taps on said primary inducing means for creating predetermined sections to which said varying amounts of power are applied.

7. A continuous flow induction furnace according to claim 1 wherein said shield means is an asbestos concrete compound, said susceptor means is formed from graphite, said insulating means is powdered carbon black and said hearth means is formed from graphite.

8. A continuous flow induction furnace according to claim 2 wherein said baffle means includes at leat one cone-type baffle and at least one sieve-type baffle.

9. A continuous flow induction furnace according to claim 1 further including a hopper means axially disposed above said hollow susceptor and adapted to dispense said raw material into said hollow susceptor.

10. A continuous flow induction furnace according to claim 1 wherein said material to be melted includes fine material less than 20% by weight and material greater than 2 inches in diameter less than 5% by weight.

11. A continuous flow induction furnace according to claim 1 wherein said hearth means comprises:
    (a) directing means for directing the molten charge and unmelted charge material;
    (b) filter means for delaying said unmelted charge material until it reaches a molten state;
    (c) reservoir means for delaying the flow of said molten charge material and said unmelted charge material until essentially all said charge material reaches a molten state; and
    (d) an orifice means disposed on said longitudinal axis of said furnace permitting said molten charge material to leave said furnace.

12. A continuous flow induction furnace according to claim 11 wherein said directing means includes a conically-shaped director centrally disposed for moving said charge material away from said longitudinal axis towards the inner susceptor wall.

13. A continuous flow induction furnace according to claim 12 further including a plurality of apertures disposed about said director for retaining said unmelted charge material.

14. A continuous flow induction furnace according to claim 12 wherein said reservoir means is disposed beneath said directing means and includes a centrally disposed weir and an exit orifice centrally disposed therein.

15. A continuous flow induction furnace according to claim 11 wherein said directing means includes a funnel-shaped director centrally disposed for moving said charge material from the inner susceptor wall towards said longitudinal axis of said furnace.

16. A continuous flow induction furnace according to claim 15 further including a plurality of downwardly sloped channels radiating from a conically-shaped central portion for retaining said unmelted charge and further including vertical apertures communicating with said downwardly sloped channels.

17. A continuous flow induction furnace according to claim 16 further including a reservoir means disposed beneath said downwardly shaped channels and said central portion and a centrally disposed weir with an exit orifice disposed therein.

* * * * *